March 22, 1960 R. S. KARDAS ET AL 2,929,294
PENDULUM TYPE SPECTROGRAPH
Filed Sept. 7, 1956 2 Sheets-Sheet 1
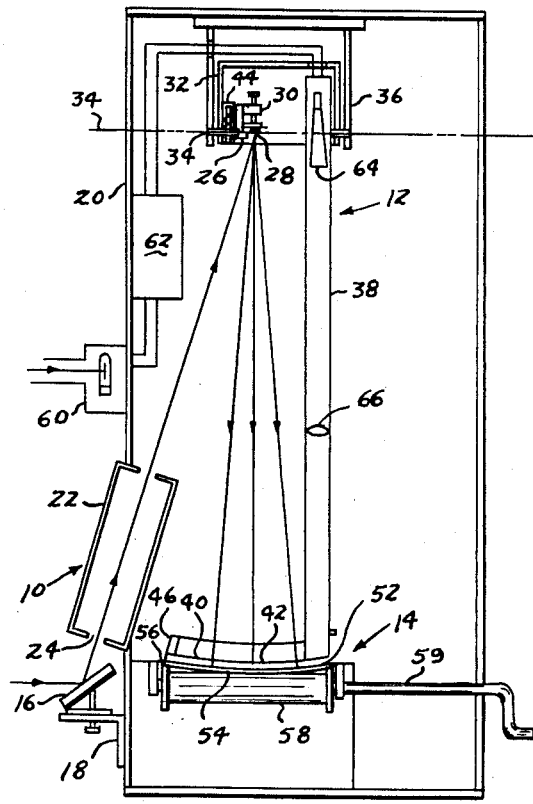
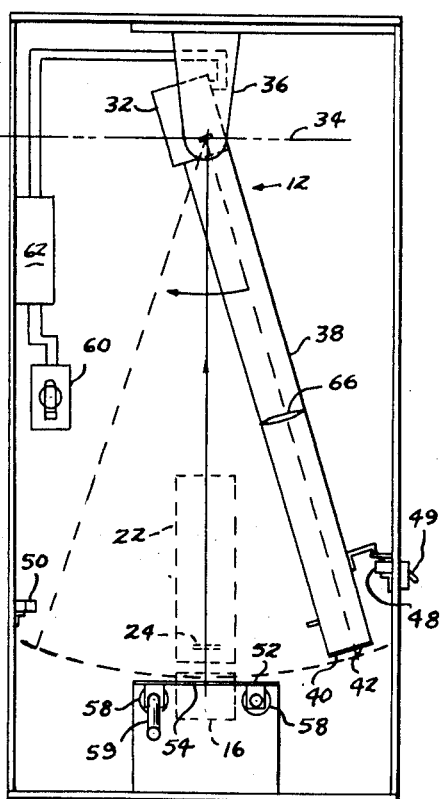
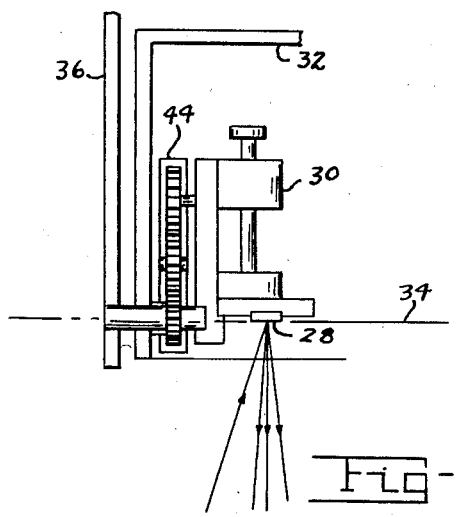
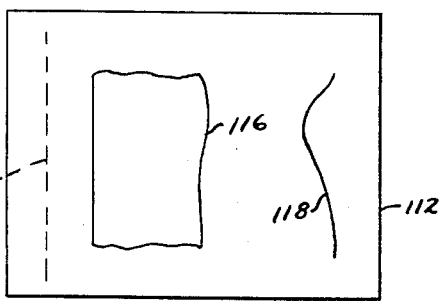
INVENTOR.
RAYMOND S. KARDAS
KOSTAS ROUTSIS
BY ARTHUR G. CHARTIER
Paul M Pakules
ATTORNEYS March 22, 1960 R. S. KARDAS ET AL 2,929,294
PENDULUM TYPE SPECTROGRAPH
Filed Sept. 7, 1956 2 Sheets-Sheet 2

INVENTOR.
RAYMOND S. KARDAS
BY KOSTAS ROUTSIS
ARTHUR G. CHARTIER
ATTORNEYS

United States Patent Office 2,929,294
Patented Mar. 22, 1960

2,929,294

PENDULUM TYPE SPECTROGRAPH

Raymond Stanley Kardas, Cocoa, Fla., and Kostas Routsis, Newington, and Arthur G. Chartier, East Hartford, Conn., assignors to the United States of America as represented by the Secretary of the Air Force Application September 7, 1956, Serial No. 608,639

11 Claims. (Cl. 88—14)

This invention relates to a spectrograph, and more particularly, to a spectrograph of the type employed for producing a spectral record in which variation in the spectrum with time can be measured.

In spectroscopy, various methods may be employed for producing and viewing spectra thereby determining the composition of a substance as by analysis of the spectrum of such substance. A spectrum being an image formed as an array of wavelengths or frequencies resulting from the dispersion of light emitted by such substance or other radiation, as by a prism or a diffraction grating, may be revealed by the spectroscope for visual examination, or may be revealed by a spectrograph for producing a permanent record thereof. Such methods, however, vary in form, not only due to differences in principle but, also, due to the type of radiation to be examined, which may range from infrared to X-rays.

The visual examination of spectrum, as by a spectroscope, is, therefore, deemed adequate if the spectrum of a substance is simple and easily recognized, or if a permanent record is not required, and if the substance can be positively recognized by the lines of an atomic spectrum, or the bands, or both, of a molecular spectrum, occurring in the visible range of the spectrum. However, if for any reason the spectral lines of a substance are faint or close together, or if important identifying spectral lines occur in the ultra-violet or infrared regions, the photographic method is more precise and therefore, mostly preferred for spectral research.

In spectrography, photometric data obtainable during a flash of a light source may fall into three categories: (1) direct intensity measurements with calibrated phototubes which, when reduced, give the time intensity curve and/or the integrated light output of the flash during a specified time interval; (2) direct high-speed motion picture photography, or integrated still photography, which reveals the radial expansion curve of the flash volume and/or its extent at or near the time of maximum light output; and (3) spectroscopic measurements of the light output, either time-resolved or integrated, which result in the instantaneous spectrum of the flash, from which may be inferred the corresponding temperature of the flash volume surface.

Such photometric data may be obtained by either of three basic spectrographic methods that may be employed for producing a record of the variation in the spectrum of a transient light source as a function of time, such as (1) the prespectrograph moving optics which rapidly sweeps an image of the light source across the entrance slit of the spectrograph, resulting in a time-resolved spectrum recorded on a stationary film; (2) normal spectrograph optics, but with movement of the recording film, or phototube, in the spectrum focal plane, resulting in time-resolved spectra recorded on the moving film; and (3) internally modified spectrograph optics which causes the spectrum image to move and record itself on a stationary film.

In carrying out the present invention, a spectrograph of the type based on either the second or the third method for obtaining photostatic data of the third category, as above described, is constructed, in which time resolution is achieved by either mounting the entire optical system of the spectrograph on a pendulum arranged to sweep the spectrum across a stationary photographic plate during swing of the pendulum, or by mounting the photographic plate on a pendulum to be swept across the focal plane of a spectrum by the swing of the pendulum. In both instances, the sweep time is regulated by the period of the pendulum. Such instrument may be constructed using either grating or prism to form the spectrum, however, grating is preferred in order to achieve high resolutions in the infrared portion of the spectrum.

It is further the purpose of the present invention to provide a spectrograph for producing a time-resolved spectrogram which when analyzed, the spectra curves may be read for density vs. wavelength at any specific time during the recorded light flash or for density vs. time at any specific wavelength. Also, the spectrograph according to the present invention may be employed for detecting any changes in the wavelength radiation variation and intensities in the spectrum of a substance, and for recording a time-intensity trace of the "white light" of a light source for accurate comparison of the spectrum trace of the light source with respect to the total light source. Furthermore, time base "pips" may be produced on the photographic plate for serving to calibrate the time scale for both the "white light" intensity and spectrum traces in each exposure.

The spectrograph of the present invention is, therefore, particularly characterized by the fact that in a single pendulum swing a synchronous record is made of the change in light flash spectrum, the "white light" intensity change, and the pendulum sweep rate.

In general, the spectrograph constructed according to the present invention consists of an apparatus including a light dispersing device for forming a spectrum, a spectrum recording device disposed substantially on the focal plane of the spectrum, and a pendulum device operatively associated therewith for regulating the time interval of the spectrum exposure.

These and other features of the present invention are described in detail below in connection with the accompanying drawings wherein like numerals designate like parts throughout the several views, and in which:

Figure 1 is a schematic side elevation of a spectrograph embodying the present invention;

Figure 2 is a schematic front elevation of the apparatus of Figure 1;

Figure 3 is a fragmentary detail showing the grating mounting of the spectrograph of Figure 1;

Figure 6 is a typical spectrogram produced by the spectrograph apparatus embodying the present invention.

Figure 4:
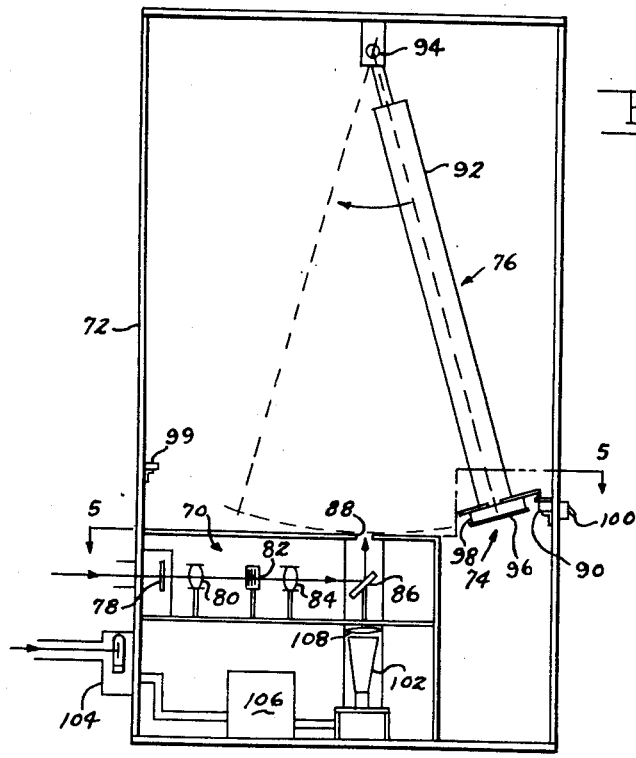
Figure 4 is a schematic side elevation of a modified spectrograph apparatus embodying the present invention.

Referring now in detail to the drawings, the embodiment of the spectrograph of the present invention schematically illustrated in Figures 1, 2 and 3 comprises an optical system, designated in general by the reference numeral 10, partially mounted on a pendulum device, generally designated at 12, for sweeping the spectrum across a stationary spectrum recording device, indicated at 14, by the swinging motion of the pendulum device 12.

The optical system 10 of the spectrograph apparatus of the present invention comprises a stationary mirror 16 mounted at an angle on a bracket 18 attached to a side of a box-like casing 20 and of a member 22 provided with an entrance slit 24 arranged to pass a beam of light from a light event deflected by the mirror 16 to a light-dispersing means 26. The light-dispersing means 26, in the preferred form, comprises a reflection grating 28 which is a replica concave reflection grating that has 15,300 lines per inch with a focus at 106 cm. and gives a linear dispersion of 16 A./mm. The reflection grating 28 is supported by a grating holder 30 pivotally mounted on a pivoting box member 32 about an axis, indicated at 34, coincident with the center of the face of the grating 28 and perpendicular to the grating line rulings thereon. The pivoting box member 32 is in turn pivotally mounted on support members 36 secured to and extending downwardly from the upper side of the casing 20. It may also be mentioned that certain of the component parts of the optical system 10 employed in the spectrograph apparatus, such as the slit assembly 24, the grating 28 and grating holder 30, may be of any type known in the art, for example, such as used in a grating spectrograph apparatus.

Pivotal movement of the pivoting member 32, and therefore of the grating 28, is obtained by a pendulum arm 38, which pendulum arm 38 is fixedly attached to the pivoting box member 32 and is arranged to swing between the sides of the casing 20, whereby the grating 28 will cause the focussed spectrum to sweep across its focal plane. The pendulum arm 38 is further provided, at its lower end, with a curved masking plate 40 formed with an exit slit 42 for masking the spectrum to the desired dimension. Since the light rays reflected off the face of the grating 28 sweeps through an angle twice that through which the grating 28 swings, the grating holder 30 is also provided with a 2:1 reduction gear train 44 (Figure 3) at its pivot on the pivoting box member 32 for holding the spectrum of the reflected beam of light in a synchronous sweep with the pendulum arm 38 and the masking plate 40. The curved masking plate 40 is also provided at the far end thereof, outside of the spectrum exposure region, with a small argon lamp bulb 44 running on normal 60 cycle current and which argon lamp bulb 46 is arranged to impress time-base "pips" on each spectrum record film.

The pendulum arm 38 is further arranged to be engaged by a solenoid release catch 48 on one side of the casing 20 and by a slide catch 50 on the opposite side of the casing 20. An electrical impulse to the solenoids of the release catch 48 by actuation of a switch 49 allows the pendulum arm 38 to fall freely to the slide catch 50 on the other side of the swing arc beyond the exposure sweep range.

The masking plate 40 carried at the lower end of the pendulum arm 38 is adapted to swing across the spectrum recording device 14 mounted on the base of the casing 20. The spectrum recording device 14 consists of a magazine 52 having a curved film platen 54 provided with edge guides 56. The curved film platen 54 is placed with its curved surface on the arc of the Rowland circle upon which also lies the focal plane of the focussed spectrum. In operation of the spectrum recording device 14, a photographic film is simply slid into the edge guides 56 of the film platen 54 and may be advanced for each event recording by rollers 58 operated by an external hand crank 59.

For the recording of a time-intensity trace of the "white light" of the light event during each spectrum exposure mentioned above, the spectrograph apparatus is provided with a phototube 60 which picks up the light event and acts through an amplifier 62 to a cathode ray tube 64 mounted on the pendulum arm 38 as shown in Figure 1. A copying lens 66 carried on the pendulum arm 38 focusses the cathode ray image on the film surface on which the image is scribed in a curve as the pendulum arm 38 sweeps through its arc.

From the above description of the apparatus of the spectrograph of the present invention, it is evident that in a single swing of the pendulum device 12 a synchronous record is made of the change in light flash spectrum, the "white light" intensity change, and the pendulum sweep rate.

Figure 5:
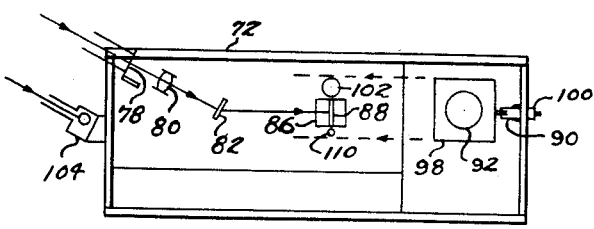
Figure 5 is a transverse section taken substantially along the line 5—5 in Figure 4.

Figures 4 and 5 show another embodiment of the spectrograph apparatus of the present invention in which an optical system 70 is mounted on the base of a casing 72, while a spectrum recording device 74 is mounted on a pendulum device 76 and is swept across the focal plane of the focussed spectrum by the swing of the pendulum device 76. In this arrangement, the optical system 70 comprises an entrance slit 78, a collimator 80, a transmission grating 82, an objective lens 84, and a stationary first surface mirror 86 mounted at 45° angle. A light spectrum formed by the transmission grating 82 from a beam of light of a light event passed through the entrance slit 78 is reflected upwardly by the mirror 86 and is focussed on a plane one-fourth of an inch above a horizontal exit slit 88.

Upon electrical operation of a solenoid release catch 90, a pendulum arm 92 pivotally mounted on a pivot 94 on the upper side of the casing 72 in line with the exit slit 88 and arranged to be engaged by the release catch 90 falls freely and sweeps across the exit slit 88 in a direction parallel to the spectrum lines giving a continuous trace of the light spectrum on a photographic film 96 placed in a film holder 98 provided at the lower end of the pendulum arm 92 as shown in Figure 4. The solenoid release catch 90 receives its electrical pulse from a relay circuit (not shown) operated by a switch 100. A slide catch 99 may also be provided on the opposite side of the casing 72 for stopping the pendulum 92 on the other side of the swing arc as shown in Figure 4 by the dotted line.

As in the apparatus of the spectrograph of Figures 1, 2 and 3 described above, accurate comparison of the spectrum trace with respect to the total light from the light event is accomplished by means of a small two inch cathode ray oscilloscope 102 actuated by a phototube 104 acting through its amplifier 106 and a copying lens 108 for projecting the light image for a time-intensity trace to be recorded on the film 96. Also, the time base "pips" are produced on the film by a small masked argon lamp bulb 110 operated on 60 cycle current and located adjacent to the exit slit 88. The argon lamp bulb 110 serves to calibrate the time scale for both the "white light" intensity and the spectrum traces in each spectrum exposure.

Figure 6 shows a typical time-resolved spectrogram 112 produced by the spectrograph apparatus of the present invention, wherein reference numerals 114, 116 and 118 designate the time scale, the spectrum, and the "white light" intensity curve, respectively. When the film record spectrogram is analyzed in the scanning mount of a recording microdensitometer, spectro curves may be read for density vs. wavelength at any specific time during the recorded light flash or for density vs. time curve at any specific wavelength.

The present invention has been described, in detail above for purposes of illustration only and is not intended to be limited by this description or otherwise except as defined in the appended claims.

We claim:

1. In a spectrograph, an entrance slit member adaptable to receive and pass a beam of light from a light event, grating means for dispersing the beam of light received from the entrance slit member to form a spectrum image at the focal plane of said grating means, film means disposed substantially on the focal plane of said grating means for recording said spectrum image thereon, pendulum means including a relatively elongated arm mounted for swinging movement in a vertical plane, masking means incorporating an exit slit positioned adjacent the focal plane of said grating means for masking the spectrum to the desired dimension, calibrating means for producing time base pips on said recording means to indicate the time scale thereon, pivotally mounted holding means adjacent one end of said pendulum arm for supporting said pendulum arm for pivotal movement, said recording means being within the focal plane of said grating means adjacent the opposite end of said pendulum arm to be swept by the opposite end of said pendulum arm on sweeping movement thereof, said pendulum means incorporating one of said spectrum forming and spectrum recording means for rotation therewith and providing relative movement therebetween within an exposure sweep range at a time interval determined by the swing of said pendulum means.

2. An apparatus for forming and recording a spectrum including an entrance slit adapted to pass a light beam received therein from a light event, a grating for dispersing the beam of light passed by the entrance slit to form a spectrum at the focal plane of said grating, a photographic plate disposed substantially on the focal plane of said grating for recording the same thereon, pendulum arm means incorporating one of said grating and said photographic plate for regulating the time interval of photographic exposure of said spectrum, masking means incorporating an exit slit positioned adjacent said photographic plate for masking the spectrum to the desired dimension, said pendulum arm means being pivoted at the upper end thereof for sweeping movement across the focal plane of said grating at the lower end thereof, and calibrating means for producing time base pips on said photographic plate to indicate the time scale thereon.

3. In a spectrograph an entrance slit adapted to pass a beam of light received therein, grating means for dispersing the beam of light from the entrance slit to form a spectrum on the focal plane of said grating means, photographic film means disposed substantially on the focal plane of said grating means for recording the spectrum image thereon, whereby the wave length variations of the spectrum may be determined, elongated pendulum means pivotally mounted at one end thereof for sweeping movement in the focal plane of said grating means at the other end thereof and incorporating one of said grating means and said photographic film means for providing movement to one of said means thereby causing a sweeping motion of the spectrum and said photographic film means relative to each other at a time interval by the swing of said pendulum means within an exposure sweep range, masking means incorporating an exit slit for focusing the light received from said entrance slit substantially on the focal plane of said grating means, and calibrating means for producing time base means on said photographic film means to indicate the time scale thereon.

4. In a spectrograph as in claim 1 wherein the relatively elongated arm of said pendulum means incorporates said film means on the opposite end thereof whereby said film means is swept across the focal plane of said grating means at a time interval determined by the period of said pendulum means within the exposure sweep range.

5. In a spectrograph as in claim 3, said exit slit positioned relative to said grating means to form a horizontally extending spectrum and said photographic film means including a photographic plate positioned on the end of said elongated pendulum means remote from its pivot for sweeping said photographic plate across the spectral focal plane at a predetermined distance from said exit slit.

6. A spectrograph according to claim 5, and oscilloscope means including a cathode ray tube, a phototube for picking up the light event and to actuate said cathode ray tube to display an image of the total light of the light event, and copying lens means for projecting said light image from said cathode ray tube on said photographic film means, thereby recording a light intensity trace on said photographic film means for comparison of said spectrum trace with respect to the light trace thereon.

7. In a spectrograph, an entrance slit assembly for receiving and passing a beam of light from a light event, grating means for dispersing the beam of light from the entrance slit assembly to form a spectrum, a stationary photographic plate disposed substantially on the spectral focal plane for recording said spectrum thereon, elongated pendulum means carrying said light dispersing means on the end thereof remote from said stationary photographic plate for scanning said spectrum across said photographic plate at a time interval determined by the period of said pendulum means in the exposure scanning range, said elongated pendulum means incorporating a relatively elongated, curved masking plate and exit slit means on the end thereof nearest said stationary photographic plate for masking the spectrum to the desired dimension, and calibrating means carried by said pendulum means for producing time base pips on said stationary photographic plate to indicate the time scale thereon, said grating means having a holding member provided with a reduction gear train arranged to pass said spectrum through said exit slit in a synchronous sweep with said elongated pendulum means across said stationary photographic plate.

8. In a spectrograph, an optical system comprising a fixed entrance slit assembly adapted to receive and pass a beam of light from a light event, a movably mounted reflection grating means for dispersing the beam of light passed from said entrance slit assembly to form a spectrum, said grating means being affixed to a rotatably mounted member provided with a reduction gear train, stationary photographic plate means disposed substantially on the spectral focal plane, pendulum means fixedly attached to said rotatably mounted member for pivotally supporting said grating means and having exit masking slit means incorporated on the end thereof remote from said rotatably mounted member and nearest said photographic plate means cooperating with said reduction gear train provided on the rotatably mounted member of said grating means arranged to pass said spectrum through said exit slit in a synchronous sweep with said pendulum means across said photographic plate means disposed substantially on the focal plane of said grating means at a time interval determined by the period of said pendulum means within the exposure sweep range thereby recording said spectrum trace on said photographic plate means for analyzing the wave length radiation variations thereof, and calibrating means carried by said pendulum means for producing time base pips on said photographic plate means to indicate the time scale thereon.

9. A spectrograph according to claim 8, an oscilloscope means including a cathode ray tube mounted on said pendulum means, a phototube for picking up the beam of light and for actuating said cathode ray tube to display an image of the total light of the beam of light, and copying lens means carried by said pendulum means for projecting said light image from said cathode ray tube on said photographic plate means, thereby recording a light intensity trace on said photographic plate means for comparison of said spectrum trace therewith.

10. A spectrograph comprising a reflection grating for dispersing a beam of light to form a horizontally extending spectrum, an entrance slit assembly for passing a beam of light received from a light event to said reflection grating, a pendulum having an arm pivotally mounted for sweeping movement in a vertical plane, said grating being pivotally mounted on said pendulum about an axis coincident with the center of the face surface of said grating and perpendicular to the line rulings of said grating, said pendulum arm having a curved masking member at the lower end thereof provided with an exit slit for permitting projection of said spectrum therethrough, said grating having a holding member provided with a reduction gear train arranged to pass said spectrum through said exit slit in a synchronous sweep with said pendulum arm across a stationary curved photographic plate disposed substantially on the focal plane of said grating at a time interval determined by the period of said pendulum arm within the spectrum exposure sweep range thereby recording said spectrum trace on said photographic plate, and calibrating means mounted on said curved member for producing pips on said photographic plate to indicate the time scale thereon.

11. A spectrograph according to claim 10, and oscilloscope means comprising a phototube and a cathode ray tube, said cathode ray tube mounted on said pendulum arm, and copying lens mounted on said pendulum arm for projecting a light image formed on said cathode ray tube picked up by said phototube from the light event on said photographic plate, thereby recording a total light intensity trace for comparison with said spectrum trace thereon.

References Cited in the file of this patent

UNITED STATES PATENTS

| 818,534 | Gerard | Apr. 24, 1906 |
| 2,221,170 | Richardson | Nov. 12, 1940 |
| 2,559,688 | Touvet | July 10, 1951 |
| 2,597,001 | Jaffe | May 20, 1952 |
| 2,706,928 | Lee et al. | Apr. 26, 1955 |
| 2,723,589 | Bullock et al. | Nov. 15, 1955 |

FOREIGN PATENTS

| 365,633 | Germany | Dec. 19, 1922 |
| 638,844 | Germany | Nov. 24, 1936 |

OTHER REFERENCES

"An Apparatus for Time-Resolved Spectroscopy," Gordon et al., pages 852, 853, Journal of the Optical Society of America, vol. 40, December 1950.